(12) United States Patent
Prince

(10) Patent No.: US 6,189,744 B1
(45) Date of Patent: *Feb. 20, 2001

(54) CONTAINERS

(75) Inventor: Cyril Miles Prince, Oxfordshire (GB)

(73) Assignee: Carnaudmetalbox (Holdings) USA Inc., Wilmington, DE (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/077,462

(22) PCT Filed: Nov. 19, 1996

(86) PCT No.: PCT/GB96/02837

§ 371 Date: May 29, 1998

§ 102(e) Date: May 29, 1998

(87) PCT Pub. No.: WO97/20757

PCT Pub. Date: Jun. 12, 1997

(30) Foreign Application Priority Data

Dec. 1, 1995 (GB) .................................... 9524628

(51) Int. Cl.[7] .................................................. B67D 5/54

(52) U.S. Cl. .................... 222/386.5; 53/470; 156/305; 220/62.21; 220/723; 493/99; 493/100

(58) Field of Search ................ 222/95, 105, 402.1, 222/386.5; 156/69, 305, 334; 53/469–471, 478–479, 470; 220/359.1, 359.4, 612, 613, 62.21, 681, 678, 723, 62.1; 264/248; 493/100, 99

(56) References Cited

U.S. PATENT DOCUMENTS

| Re. 26,488 | * | 11/1968 | Bull | 222/386.5 X |
|---|---|---|---|---|
| 566,282 | * | 8/1896 | Bailey, Jr. | 222/386.5 |
| 2,597,715 | * | 5/1952 | Erikson | 222/386.5 X |
| 2,816,691 | * | 12/1957 | Ward | 222/183 |
| 2,876,725 | * | 3/1959 | Buck et al. | 220/678 X |
| 3,020,688 | * | 2/1962 | Moderno | 53/425 |
| 3,369,568 | * | 2/1968 | Davis et al. | 220/681 X |
| 3,452,694 | * | 7/1969 | Ratzer | 220/678 X |
| 3,499,819 | * | 3/1970 | Lewis | 428/317.1 |
| 3,615,965 | * | 10/1971 | Smith | 220/613 X |
| 3,616,047 | * | 10/1971 | Kehe | 156/334 |
| 3,823,849 | * | 7/1974 | Ruscitti | 222/96 |
| 3,828,977 | * | 8/1974 | Borchert | 222/386.5 X |
| 3,907,442 | * | 9/1975 | Reid | 220/681 X |
| 4,012,270 | * | 3/1977 | Fitko | 156/309.3 |
| 4,032,064 | * | 6/1977 | Giggard | 222/95 |
| 4,185,758 | * | 1/1980 | Giggard | 222/386.5 |
| 4,189,069 | * | 2/1980 | Stoody | 222/83.5 |

(List continued on next page.)

FOREIGN PATENT DOCUMENTS

| 0312302 | | 10/1988 | (EP) . | |
|---|---|---|---|---|
| 368112 | * | 5/1990 | (EP) | 222/386.5 |
| 354137 | * | 7/1990 | (EP) . | |
| 2027130 | * | 2/1980 | (GB) . | |
| 2024334 | * | 9/1980 | (GB) . | |
| 2089897 | * | 6/1982 | (GB) . | |

\* cited by examiner

*Primary Examiner*—Allan N. Shoap
*Assistant Examiner*—Joe Merek
(74) *Attorney, Agent, or Firm*—Diller, Ramik & Wight, PC

(57) ABSTRACT

A compartmented container, such as an aerosol container, has a plastics pouch (12) attached to a top component such as an aerosol cone (1). The cone is typically formed of steel laminated with polypropylene, and the pouch is attached to the cone by means of a platics/plastics heat-sealed bond using the polypropylene surface layer of the cone. The pouch is attached to the cone (1) at an area away from that used to attach the cone to an aerosol container with a double seam. The cone typically has an annular countersink (4) and the pouch is attached either to the outer countersink wall (5) or the inner countersink wall (6).

17 Claims, 3 Drawing Sheets

U.S. PATENT DOCUMENTS

| | | | |
|---|---|---|---|
| 4,254,894 | * | 3/1981 | Fetters .......................... 222/386.5 X |
| 4,293,353 | * | 10/1981 | Pelton et al. ............................ 156/69 |
| 4,308,973 | * | 1/1982 | Irland .............................. 220/495.01 |
| 4,383,399 | * | 5/1983 | Stoody ................................... 53/470 |
| 4,640,432 | * | 2/1987 | Tate, Jr. et al. ...................... 220/678 |
| 4,943,167 | * | 7/1990 | Gelbard ........................... 383/107 X |
| 5,123,571 | * | 6/1992 | Rebeyrolle et al. .................. 222/105 |
| 5,190,184 | * | 3/1993 | Lechner ............................... 220/723 |
| 5,248,063 | * | 9/1993 | Abbott ................................... 222/95 |
| 5,388,716 | * | 2/1995 | Stoffel et al. ............................ 222/3 |
| 5,636,761 | * | 6/1997 | Diamond et al. .................... 220/619 |

CONTAINERS

BACKGROUND OF THE INVENTION

The present invention relates to compartmented containers i.e. containers having a bag or diaphragm to separate the interior of the container into at least two sections. Such compartmented containers have found widespread use in aerosols where it is desirable to separate the propellant gases from the contents to be dispensed from the container.

UK patent application No. 2024334A is an example of such a compartmented aerosol container, which uses an adhesive to secure a plastics pouch to the sidewall of the aerosol can. An alternative type of compartmented aerosol container is shown in EP0354137A, in which an injection moulded shoulder is glued to an aerosol can body, a pouch being bonded to a portion of the shoulder insert. More commonly, a metallic top component is provided, and the pouch or bag is secured by crimping the top of the bag into the double seamed joint between the can body and the top component. An example of this type of container is GB2027130A Enrich crimps a pouch by means of the double seam, but is also subjected to a heat treatment to bond the pouch and repair any tears in the pouch caused by the double seaming. The present invention attempts to avoid the use of adhesives, and the problems of tearing the bag when it is secured by means of the double seam.

SUMMARY OF THE INVENTION

Accordingly there is provided a method of manufacturing a compartmented container characterised by the steps of:
 i. forming a plastics pouch being open at at least one of its ends;
 ii. forming a metallic top component having at least one surface thereof coated with a polymeric layer;
 iii. heat-sealing the often end of the pouch and the top component one to the other by means of a plastics/plastics bond between the pouch and the polymeric layer of the top component;
 iv. inserting the pouch into a tubular container body such that the top component is adjacent one open end of the container body; and
 v. securing the top component onto the container body by means of a seaming operation.

The top component preferably includes an annular countersink, and the open end of the pouch is heat-sealed to a wall of the annular countersink. Preferably the pouch is heat-sealed to the top component by means of an induction heater. Alternatively, the pouch may be heat-sealed to the top component by means of the injection of a line of molten polymer material in order to bond the panel to the top component one to the other. In this instance the molten polymer material is preferably polypropylene.

The plastics pouch is conveniently formed as a continuous tube and subsequently cut to length. One end of the pouch may be closed and sealed prior to heat-sealing the opposite end to the top component, but more preferably one end is heat-sealed to the top component, and the opposite end is closed and sealed prior to insertion of the pouch in the tubular container.

According to a further aspect of the invention there is provided a compartmented container comprising a tubular container body having an open upper end, a plastics pouch having a closed lower end and an open upper end, and a top component connected to and closing the container body by means of a double seam, the top component being formed of metal and having at least its inner surface coated with a polymeric layer characterised in that the open upper end of the plastics pouch is heat-sealed to the top component at an area away from that of the double seam by means of a plastics/plastics bond between the pouch and the polymeric layer on the top component.

The term "coated" is herein meant to include metal/polymer laminates such as those of our European patent No. EP 0312302B, as well as other coated techniques for producing metal coils coated with plastics material as will be known by those skilled in the art. Preferably one or both of the tubular container body and the top component are formed of steel coated with a polymeric layer. Conveniently one or both of the tubular container body and the top component have at least their inner surface coated with a layer of polypropylene. Preferably the compartmented container is an aerosol container, and the top component is conveniently an aerosol cone.

According to a further aspect of the invention there is provided, in combination, a top component for an container and a plastics pouch, the top component being formed of metal and having at least one surface thereof coated with a polymeric layer, the top component having a seaming flange portion adapted to be used to attach the top component to a container body by means of a double seam, the plastics pouch being open at at least one of its ends, characterised in that the open end of the pouch is heat-sealed to the top component at an area away from the seaming flange portion by means of a plastics/plastics bond between the pouch and the polymeric layer of the top component. Preferably the plastics pouch is open at one end and closed at the other end, ready for receiving the conents to be dispensed from the container.

The invention will now be further described, by way of example only, with reference to the accompanying drawings, in which;

DESCRIPTION OF THE PREFERRED EMBODIMENTS

Figure 1A:
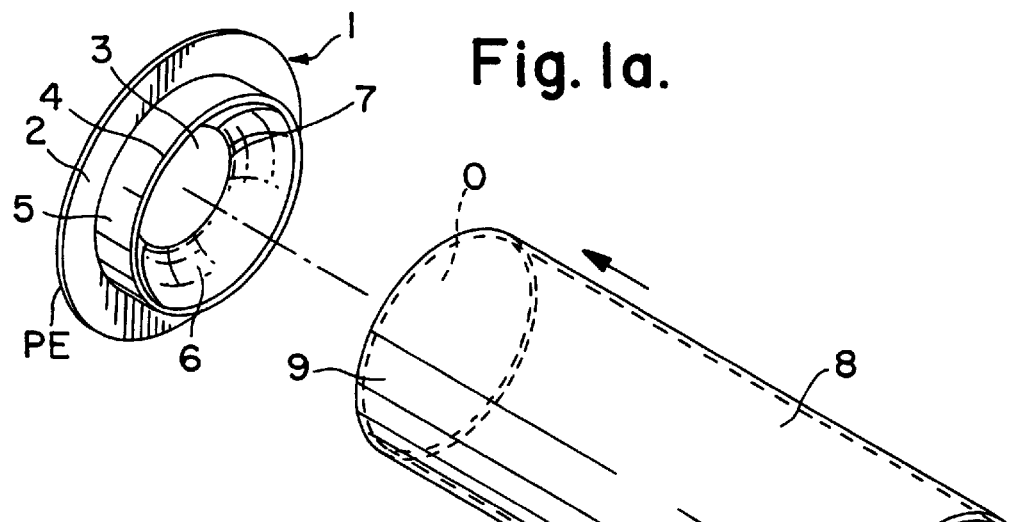
FIGS. 1a to 1c are schematic views of a combination of aerosol top component and plastics pouch in accordance with the present invention.

Referring to FIG. 1a, an aerosol top component known as a cone is shown generally at 1 and comprises an external flange 2, an internal valve cup orifice 3, and between the two a downwardly depending countersink 4. An outer countersink wall 5 connects the flange 2 to the countersink 4, whilst an inner countersink wall 6 connects the countersink 4 to the valve cup orifice 3, terminating in a curl 7. The cone 1 is formed of steel laminated with polypropylene/polymeric layer (PL).

Figure 1B:
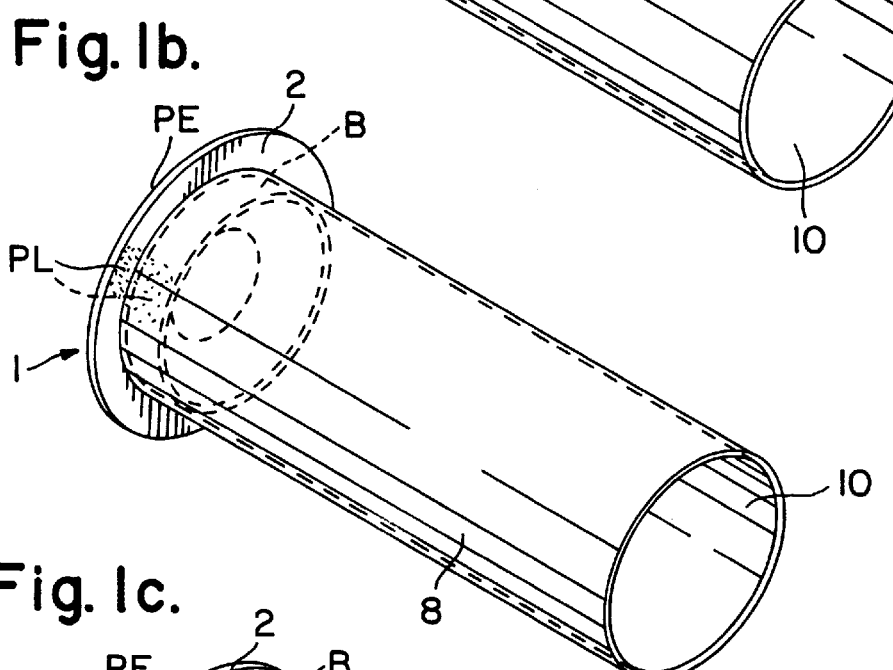

A plastics tube is shown at 8, also formed of polypropylene, and having open ends 9 and 10 as shown in FIG. 1a. FIG. 1b shows the tube 8 being applied to the cone 1, with an opening 0 at the open end 9 being fitted over the countersink 4 to form an intimate contact with the outer countersink wall 5. Heat is then locally applied, by means of an induction heater (not shown) in order to form a plastics/plastics heat-sealed bond B between the polypropylene of the tube 8 and that of the polypropylene surface layer PL of the aerosol cone 1. Once the tube 8 and cone 1 have been secured one to the other, the opposite end 10 of the tube is formed into a gusset 11 and sealed. The tube 8 is now formed into a bag 12 attached to the aerosol cone 1, and the combination of cone and bag can then be inserted into an aerosol container, such as the aerosol container AC of FIG. 2(a).

Figure 1C:
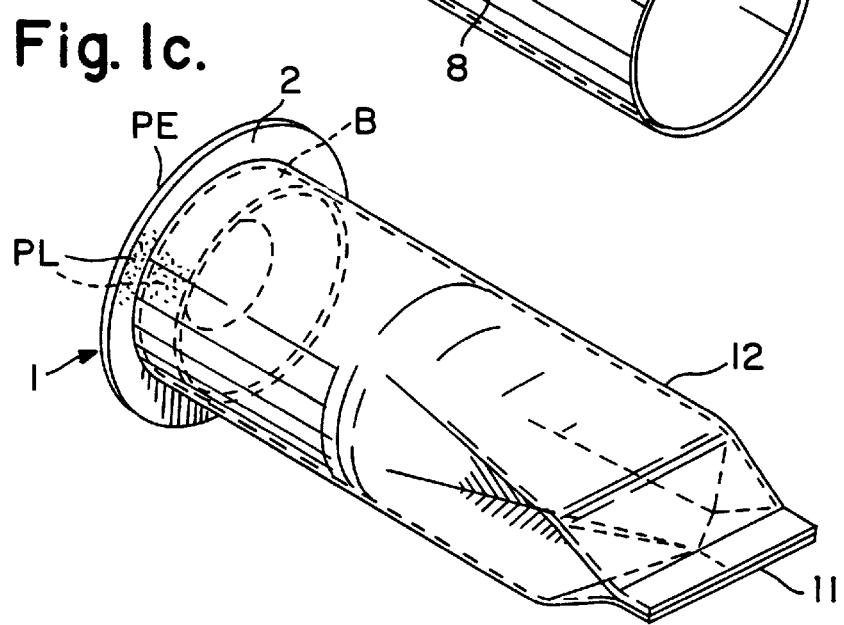
Figure 2:
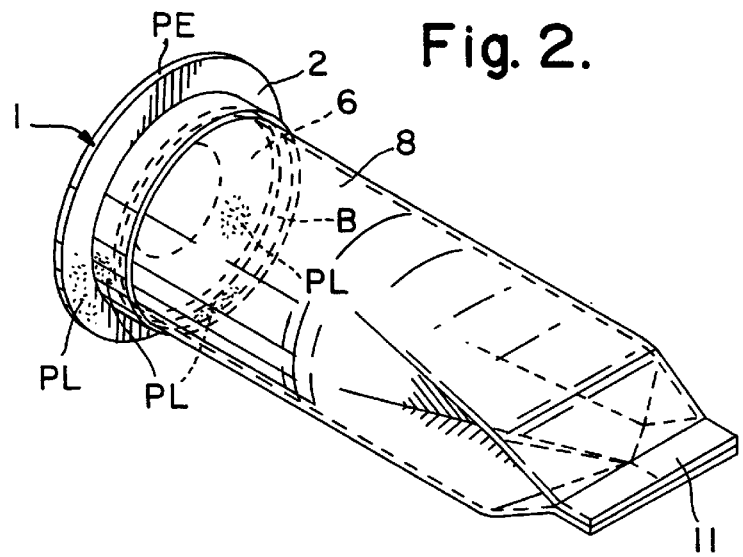
FIG. 2 is a schematic view of an alternative embodiment of combination in accordance with the present invention.
Figure 2A:
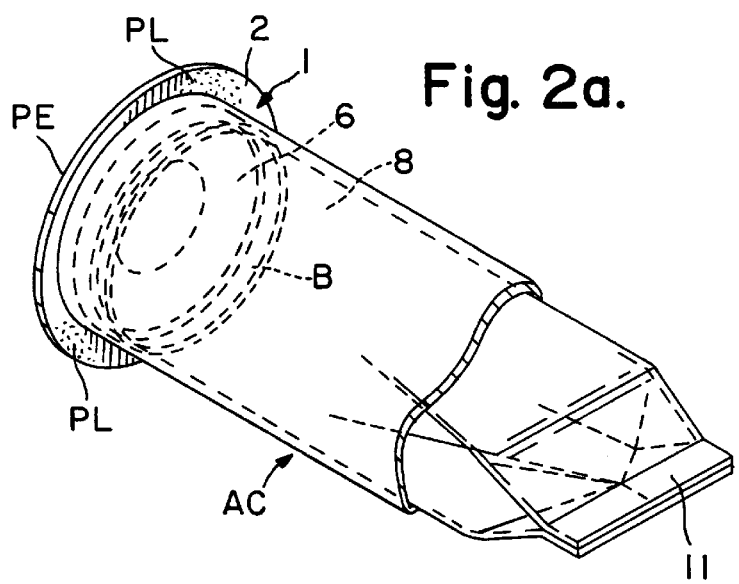
FIG. 2(a) is a schematic view illustrating the combination of a cone and bag inserted into an aerosol container.

The alternative version of FIG. 2 is similar to that of FIGS. 1a to 1c and like parts are indicated by means of like reference numerals. The construction of FIG. 2 differs from FIGS. 1a to 1c in that the tube 8 is attached to the inner countersink wall 6 radially inboard of a terminal perpheral edge PE of the external flange 2 of the aerosol container AC. As before, a heat-sealed bond B is formed between the polypropylene of the tube 8 and the polymeric layer PL on the surface of the cone.

Figure 3:
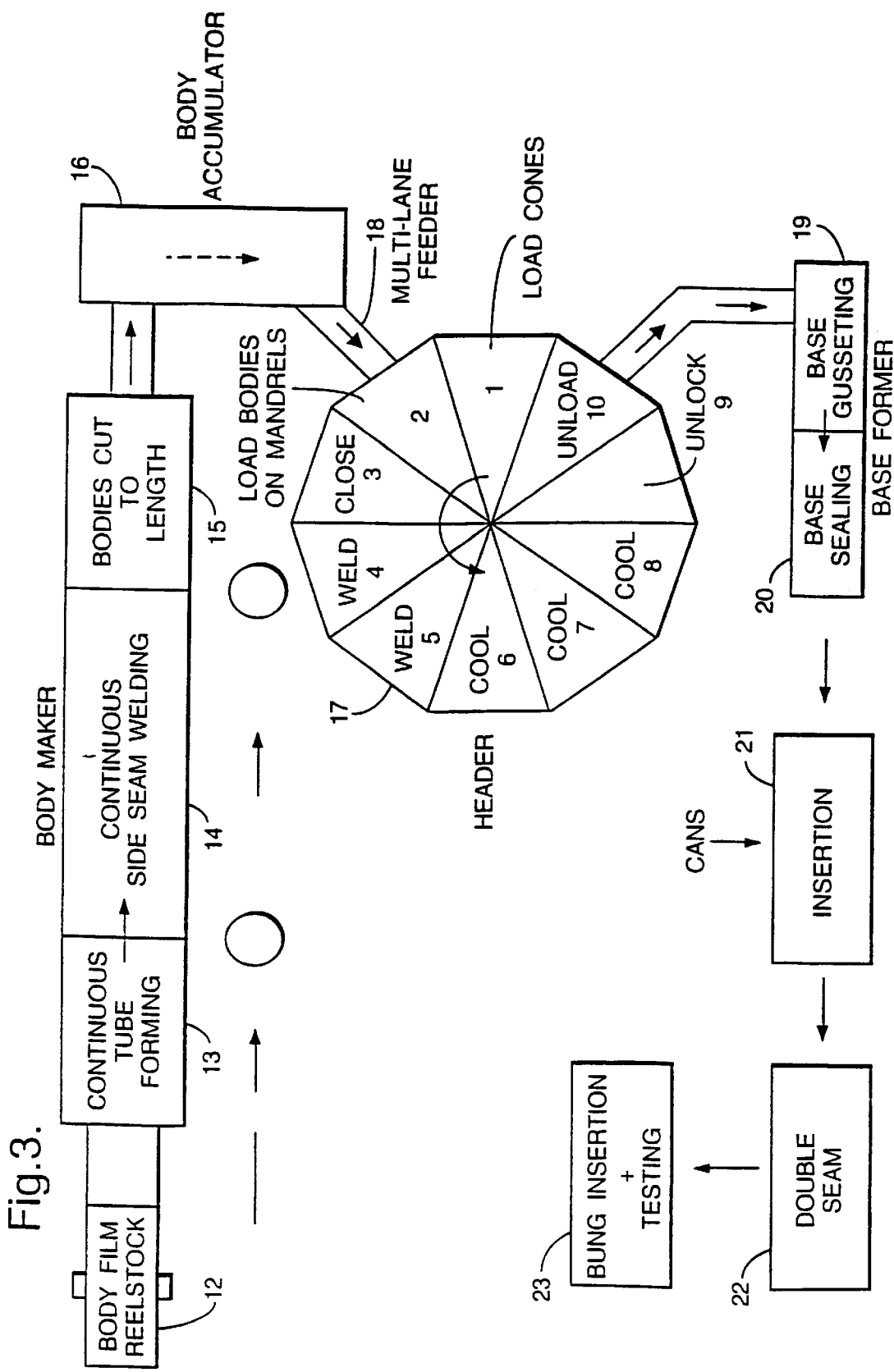
FIG. 3 is a flow diagram showing the manufacture and assembly of aerosol containers in accordance with the present invention.

FIG. 3 indicates the manufacuring process associated with one embodiment of the invention. Polypropylene film of thickness 100μ is fed from reel stock 12 and folded into a tube at a folding station 13. The overlapping side seam is welded at 14 and the resulting tube is cut to length at cutting station 15. An accumulator 16 stores the tubes and feeds them to a turret header 17 via a feeder 18.

Figure 2B:
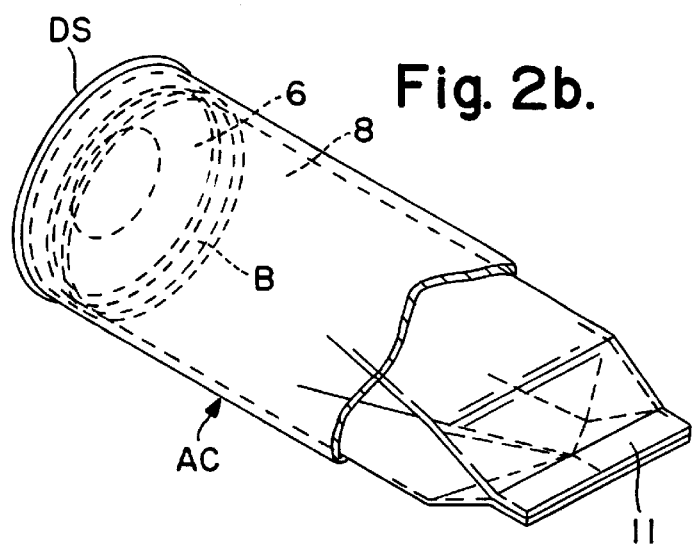
FIG. 2(b) is a schematic view of the combination of FIG. 2(a), and illustrates the cone double seamed to the body of the aerosol container.

At the first station of the header aerosol cans are loaded into position. At the second station the tubes are loaded onto mandrels, and the tubes and cones are brought together at the third station. An induction heater applies heat to seal the tubes and the cones one to the other at the fourth and fifth stations, and the resulting combination is allowed to cool through the sixth to eighth stations. At the ninth station the mandrel is withdrawn, and the combination is ejected at the tenth station. The open end of the tube is next formed into a gusset at a base forming station 19, and sealed in place at the sealing station 20. The resulting combination, as shown in FIG. 1c or 2 depending on the embodiment, is then inserted into an aerosol can body at insertion station 21. The cone is then double seamed (DS of FIG. 2(b)) onto the can body at a seamer 22, and then the double seamed cone and can body FIG. 2(b) is passed to a bung insertion station 23, where a rubber bung is. inserted into a small aperture at the base of the aerosol can body. The container is then tested before leaving to be filled with product, after which a valve cup is applied to close the valve cup orifice, and a propellant is introduced through the base of the can via the rubber bung.

As can be seen from the above description, the heat-sealing of the bag allows a number of different options for the provision of the bag within the aerosol container. Although the use of a monolayer polypropylene bag has been described, alternative materials may be employed, including multilayer arrangements with barrier materials such as EVOH, PVdC, Polyamides or Polyesters, or even non-polymeric barrier materials such as metal foils or ceramic materials.

Although a preferred embodiment of the invention has been specifically illustrated and described herein, it is to be understood that minor variations may be made in the apparatus without departing from the spirit and scope of the invention, as defined the appended claims.

What is claimed is:

1. A method of manufacturing a compartmented container (AC) comprising the steps of:
   i. forming a plastic pouch (12) open at least at one of its ends (9);
   ii. forming a metallic aerosol dome top component (1) having an outer depending wall (5) and a dome shaped inner wall (6) ascending to an opening, said dome shaped inner wall (6) including an inner surface thereof coated with a polymeric layer (PL);
   iii. heat-sealing the at least one open end (9) of the pouch (12) and the aerosol dome top component (1) to each other by means of a plastic-to-plastic bond (B) between the pouch (12) and the polymeric layer (PL) upon the dome shaped inner wall inner surface of the aerosol dome top component (1);
   iv. inserting the pouch (12) into a tubular container body (AC) such that the aerosol dome top component (1) is adjacent one open end of the container body (AC); and
   v. securing the aerosol dome top component (1) onto the container body (AC) by means of a seaming operation (DS) between the container body one open end and a terminal peripheral portion (PE) of the aerosol dome top component (1) radially outboard of the plastic-to-plastic bond (B) whereby the latter is not adversely affected during the seaming operation.

2. The method according to claim 1 wherein the pouch is heat-sealed to the aerosol dome top component dome shaped inner wall inner surface by means of an induction heater.

3. The method according to claim 1 wherein the pouch is heat-sealed to the aerosol dome top component dome shaped inner wall inner surface by means of the injection of a line of molten polymer material in order to bond the pouch and the aerosol dome top component one to the other.

4. The method according to claim 3 wherein the molten polymer material is polypropylene.

5. The method according to claim 1 wherein the plastic pouch (12) is formed as a continuous tube and is subsequently cut to length.

6. The method according to claim 1 including the step of closing and sealing another end of the pouch opposite the at least one end heat-sealed to the aerosol dome top component prior to the insertion of the pouch (12) into the tubular container.

7. A compartmented container comprising a tubular container body (AC) having an open upper end, a plastic pouch (12) having a closed lower end (10) and an open upper end (9), a metallic aerosol dome top component (1) connected to and closing the container body (AC) by means of a double seam (DS), the aerosol dome top component (1) having an outer depending wall (5) and a dome shaped inner wall (6) ascending to an opening, said dome shaped inner wall (6) including an inner surface coated with a polymeric layer (PL), and the open upper end (9) of the plastic pouch (12) being heat-sealed to the aerosol dome top component (1) at a peripheral surface radially inboard of the double seam (DS) by means of a plastic-to-plastic bond (B) between the pouch (12) and the polymeric layer (PL) on the aerosol dome top component dome shaped inner wall inner surface whereby the plastic-to-plastic bond (B) is not adversely affected during the forming of the double seam (DS).

8. The container according to claim 7 wherein at least one of the tubular container body and the aerosol dome top component are formed of steel coated with a polymeric layer.

9. The container according to claim 7 wherein at least one of the tubular container body and the aerosol dome top component have at least their inner surface coated with a layer of polypropylene.

10. The container according to claim 11 wherein the top component (1) is an aerosol cone.

11. A combination comprising an aerosol dome top component (1), a container (AC) and a plastic pouch (12); the aerosol dome top component (1) being formed of metal and having an outer depending wall (5) and a dome shaped inner wall (6) ascending to an opening, said dome shaped inner wall (6) including an inner surface coated with a polymeric layer (PL), the aerosol dome top component (1) having a seaming flange portion (2) adapted to be used to attach the aerosol dome top component (1) to the container body (AC) by means of a double seam (DS), the plastic pouch (12) being open at least at one of its ends (9), and the open end (9) of the plastic pouch (12) being heat-sealed to the aerosol dome top component dome shaped inner wall inner surface radially inboard of the seaming flange portion (2) by means of a plastic-to-plastic bond (B) between the pouch (12) and the polymeric layer (PL) of the aerosol dome top component (1) whereby the plastic-to-plastic bond (B) is not adversely affected during the forming of the double seam.

12. The combination according to claim 11 wherein the plastic pouch (12) is open at one end and closed at the other end.

13. The container according to claim 9 wherein at least one of the tubular container body and the aerosol dome top component have at least their inner surface coated with a layer of polypropylene.

14. A method of manufacturing a compartmented container comprising the steps of:

i. forming a plastic pouch (12) having an opening (0) at least at one of its ends (9);

ii. forming a metallic aerosol dome top component (1) including an external flange (2) terminating at a peripheral edge (PE) and including an outer depending wall (5) and a dome shaped inner wall (6) ascending to an opening, said dome shaped inner wall (6) including an inner surface coated with a polymeric layer (PL);

iii. heat-sealing the at least one open end (9) of the pouch (12) and the dome shaped inner wall (6) of the aerosol dome top component (1) to each other by means of a plastic-to-plastic bond (B) between the plastic pouch (12) and the polymeric layer (PL) of the aerosol dome top component dome shaped inner wall inner surface;

iv. inserting the pouch (12) into a tubular container body (AC) such that the aerosol dome top component (1) is adjacent one open end of the container body (AC); and v. securing the aerosol dome top component (1) to the container body (AC) by means of a seaming operation (DS) between the container body one open end and the external flange (2) of the aerosol dome top component (1) radially outboard of the plastic-to-plastic bond (B) whereby the plastic-to-plastic bond (B) is not adversely affected during the seaming operation.

15. The method as defined in claim 22 wherein the heat-sealing is performed by induction heating.

16. The method as defined in claim 22 wherein the pouch is heat-sealed to the inner surface of the aerosol dome top component dome shaped inner wall inner surface by means of injection of a line of molten polymer material in order to bond the pouch and the aerosol dome top component one to the other.

17. A compartmented container comprising a tubular body (AC) having an open upper end, a plastic pouch (12) having a closed lower end (10) and an open upper end (9); a metallic aerosol dome top component (1) having an external flange (2) terminating at a peripheral edge (PE), an outer depending wall (5) and a dome shaped inner wall (6) ascending to an opening with an inner surface of said dome shaped inner wall (6) being coated with a polymeric layer (PL); the open upper end (9) of the plastic pouch (12) being heat-sealed to the inner surface of the inner dome shaped wall (6) of the aerosol dome top component (1) radially inboard of a double seam (DS) securing the container body (AC) to the aerosol dome top component (1) whereby the plastic-to-plastic bond (B) is not adversely affected during the forming of the double seam (DS).

* * * * *